May 19, 1925.  1,538,738
A. S. OLDHAM
FOOD WARMER
Filed Jan. 17, 1924  3 Sheets-Sheet 1
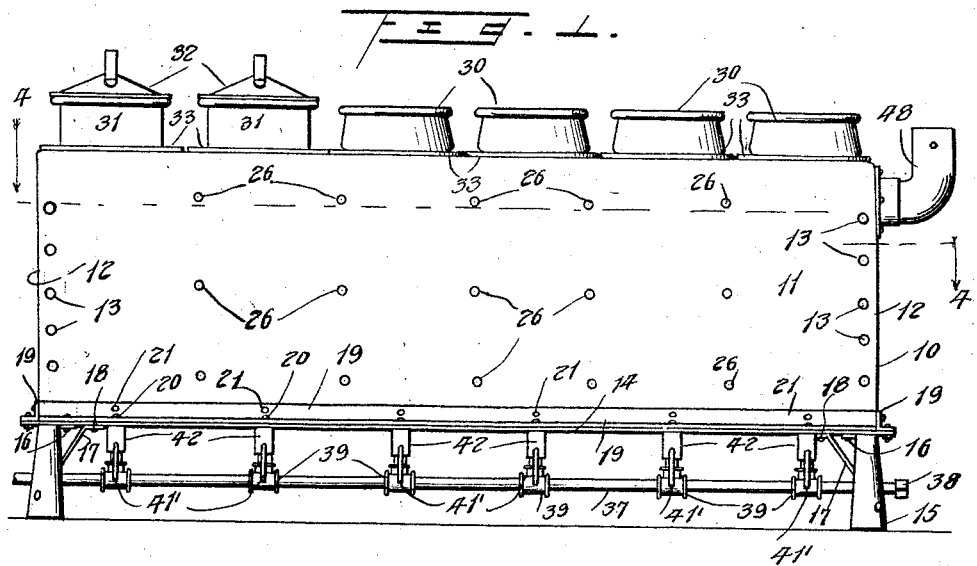
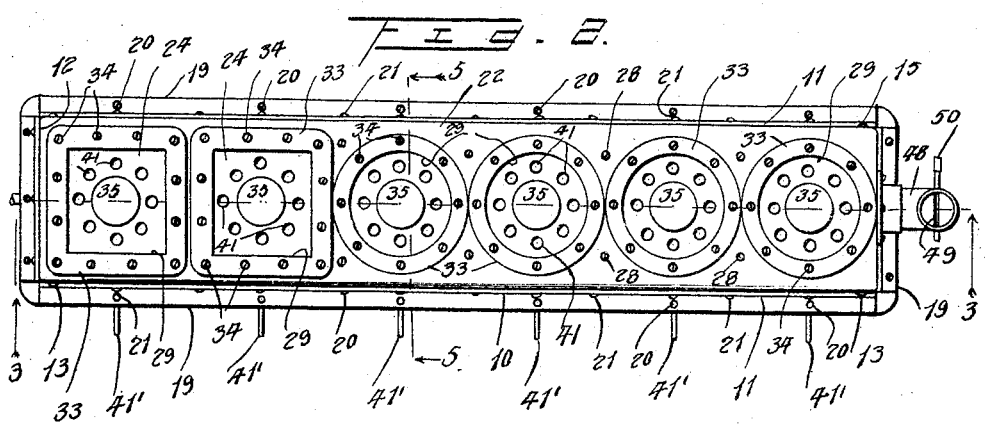
Inventor
A. S. Oldham.
By 
Attorney

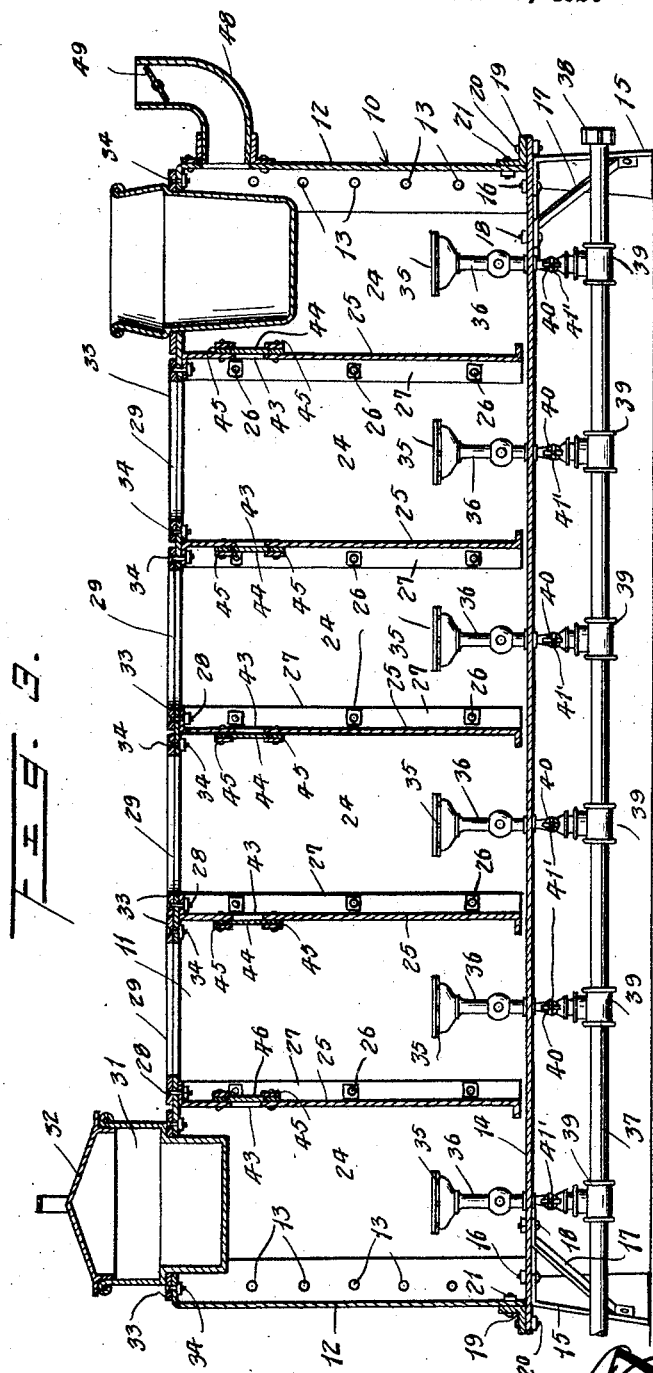

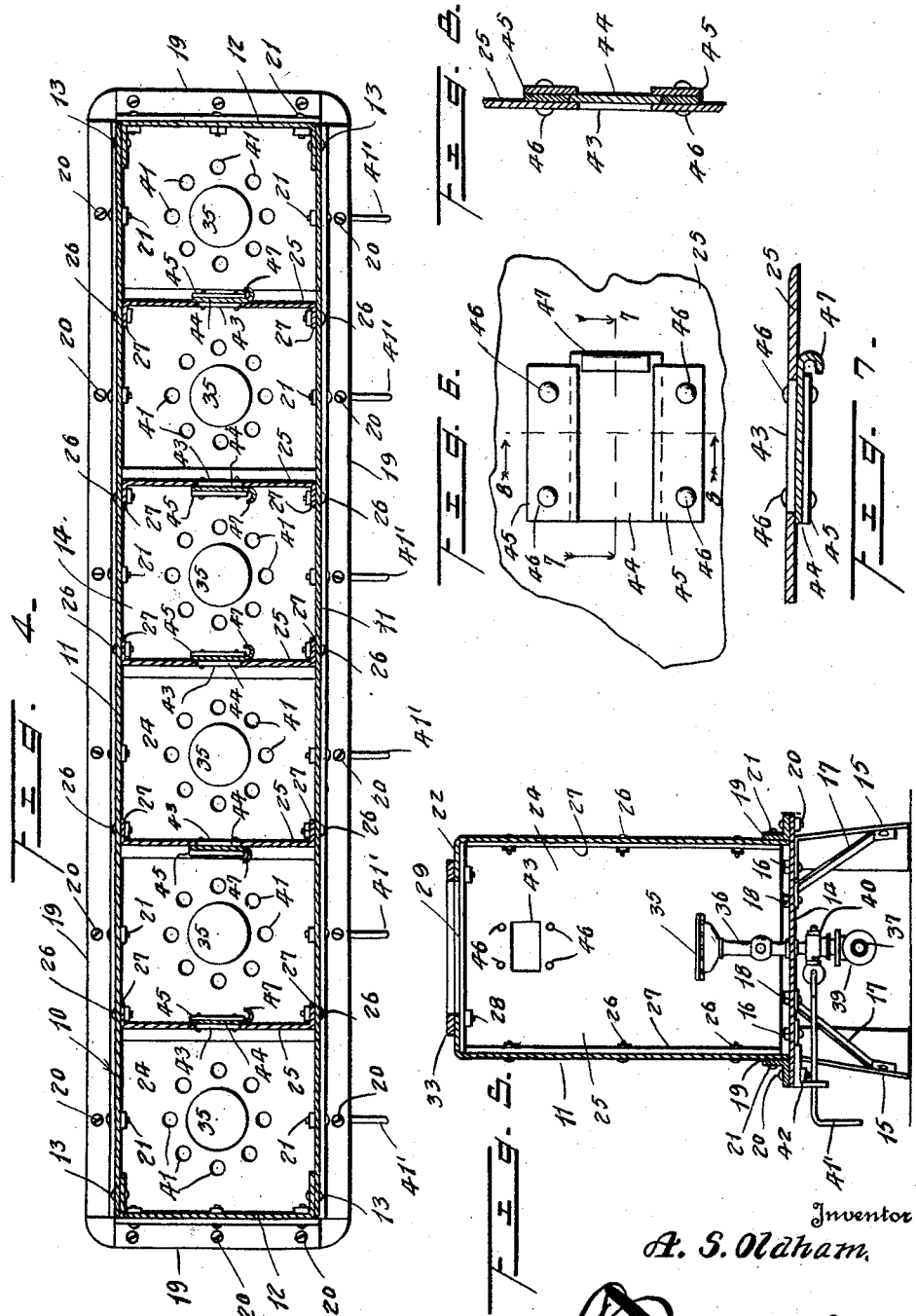

Patented May 19, 1925.

1,538,738

UNITED STATES PATENT OFFICE.

ARTHUR S. OLDHAM, OF MIAMI, OKLAHOMA.

FOOD WARMER.

Application filed January 17, 1924. Serial No. 686,909.

*To all whom it may concern:*

Be it known that I, ARTHUR S. OLDHAM, a citizen of the United States, residing at Miami, in the county of Ottawa and State of Oklahoma, have invented certain new and useful Improvements in Food Warmers; and I do hereby declare the following to be a full, clear, and exact description of the invention, such as will enable others skilled in the art to which it appertains to make and use the same.

This invention relates to a warming apparatus primarily designed for use in connection with food as in lunch rooms, restaurants, hotel kitchens and the like for the same general purpose for which the steam table is now employed.

It is aimed however to provide a novel apparatus which may be manufactured and sold at considerably less cost, requires less heat for operation than the steam table, and is simpler to operate, aside from other advantages to be specifically enumerated.

A further object is to provide a construction wherein a plurality of heating chambers or compartments are afforded which may be jointly used or individually, or in any group used according to the material to be warmed or heated.

Another object is to provide a construction in which the compartments are heated by gas, oil or similar burners so arranged that the flame therefrom will not strike the vessels or containers for the food, to the end that the latter will not be heated unevenly and there will be no danger of burning the same.

Various additional objects and advantages will become apparent from a consideration of the description following taken in connection with accompanying drawings illustrating an operative embodiment.

In said drawings:—

Figure 1 is a side elevation of the apparatus;

Figure 2 is a plan view thereof, but with the food containers removed;

Figure 3 is a substantially central longitudinal sectional view taken on the line 3—3 of Figure 2, but showing several of the food containers in place;

Figure 4 is a horizontal sectional view taken on the line 4—4 of Figure 1;

Figure 5 is a vertical sectional view taken on the line 5—5 of Figure 2;

Figure 6 is a fragmentary elevation of one of the partitions particularly showing the damper or valve thereof;

Figure 7 is a cross sectional view on the line 7—7 of Figure 6, and

Figure 8 is a cross sectional view on the line 8—8 of Figure 6.

Like reference characters designate like or similar parts in the different views.

Referring specifically to the drawings, the device comprises a body or casing of suitable shape in the present instance generally designated 10 and preferably being rectangular. This body may consist of side sheets or plates 11 spanned by end plates or sheets 12 to which they are fastened as by rivets or bolts 13. 14 designates a bottom plate or wall supporting the said plates or walls 11 and 12 and being elevated above the floor or foundation as by corner legs 15 bolted thereto at 16 and reenforced by braces 17 bolted to them and to the wall 14 as at 18. Bottom wall 14 projects outwardly beyond said side and end walls 11 and 12, and has angle reinforcing members 19 secured thereto as by bolts 20 and secured to the walls 12 as by bolts 21.

The top plate or wall of the casing is designated 22 and serves as the table, being bolted or otherwise fastened to the walls 11 and 12 at 23. Within the casing 10, the same is subdivided into compartments or chambers 24 by partition plates or walls 25 which are bolted or otherwise fastened as at 26 to the side walls or plates 11. Said partitions 25 have flanges 27 through which said bolts 26 pass and at the top, said flanges are continued and have bolts 28 passing therethrough securing them to the top or table wall 22. Wall 22 above each compartment 24 is provided with an opening 29 of any appropriate shape adapted to be occupied by food containers such as those suggested at 30 and 31. The latter may have a removable cover 32. It will be understood that any number of the compartments or chambers 24 may be provided. For meats, containers such as 31, are preferably employed, being usually square in horizontal cross section. In the case of materials or foods other than meats, round containers such as 30 are preferably employed. Since the meat containers are frequently employed in the proportion of one to three of the other containers, the illustrated apparatus preferably is adapted to contain two of the containers 31 and four of the containers 30 although this proportion may obviously be varied. The plate 22 about the openings 29 is preferably reenforced by endless rims 33, some being round and some being square according to the shape of openings 29 and which rims are bolted or otherwise secured as at 34 to table plate 22.

Located in each compartment 25 is a burner 35, arranged considerably below the containers so that the flame therefrom cannot strike the containers or serve to unevenly heat the same. These burners are supported by fuel supplied pipes 36 in upstanding relation and secured to the bottom wall 14. Below bottom wall 14, a fuel feeder pipe 37 closed at one end 38, is in communication with a source of fuel and has connection by couplings as at 39 to the pipes 36. Pipes 36 have cutoff valves 40 therein, preferably arranged below the wall 14. These valves 40 are independently operable. To afford the necessary draft for the burners 35, and air to the compartments 24, a series of openings 41 surround each burner 35 within each compartment 24 and preferably being provided through wall 14. To facilitate manipulation of the valves 40, they preferably have operating elements 41' extending therefrom to and beyond one side of the device and preferably being journaled in guide brackets 42 fastened in place by adjacent bolts 20.

Each partition 25, preferably adjacent its top, is provided with a port or opening 43, whereby heated air may pass or travel from one compartment 24 to the others to the end that the device may be evenly heated. These openings or ports 43 however may be closed by slide valves or damper plates 44 positioned and slidably mounted by cleats 45 riveted or bolted at 46 to the partitions 25. The valve 44 may be manipulated in any desired way and to this end preferably have outwardly curled flanges 47. When the device is not too hot, the hand may be inserted through the openings 29 to manually engage flanges 47 in order to slide the valve to open or closed position and when the device is too hot for insertion of the hand, a suitable tool may be inserted through such opening 29 to engage the flange 47 and operate the valve 44 in the same manner.

One end wall 12 preferably adjacent the top, is provided with an outlet opening from which an elbow or other discharge flue 48 may extend. The opening and closing of such flue 48, is controlled by a suitable damper 49, for instance carried and operable by a spindle 50 journaled in the wall of the flue.

In use, the containers 30 and 31 are disposed in the openings 29 and gas or other fuel is supplied through the feeder 37 and thence through the pipes 36 with valves 40 open, to burners 35, where the same is ignited. Under these conditions, the valves or dampers 44 are preferably in open position and hence the heated air from one compartment may travel and mix with the heated air of the other compartment to the end that the entire apparatus may be evenly heated. The air, as is obvious, enters through the openings or ports 41. Due to the partition 25 and such valves or dampers 44, when a single container 30 or 31 is to be heated or any number of them less than the maximum capacity are to be heated, the appropriate valves 40 may be closed and the appropriate valves 44 are closed to the end that communication between undesired compartments 24 is cut off. In this way, the compartments 24 are individual or may be placed merely in communication with one or more of the other compartments less than the whole number. Due to the present construction, great conservation of heat is realized, particularly in view of the fact that the compartments may be operated individually and also since the use of water is avoided as air is heated instead of water and is of less density.

In practice, the parts of the casing 10 are preferably made of sheet metal.

Various changes may be resorted to within the spirit and scope of the invention.

I claim as my invention:—

1. A warmer for foods or the like having a casing, said casing being provided with vertical partitions affording individual warming compartments, containers, means to support the containers in positions depending into the compartments, individually controlled heating means disposed in each compartment, and means associated with said partitions normally preventing communication between them operable to establish communication between each compartment and the remaining compartments.

2. A warmer for food or the like having a casing, said casing being provided with vertical partitions affording individual warming compartments, containers, means to support the containers in positions depending into the compartments, individually controlled heating means disposed in each compartment, and means associated with said partitions normally preventing communication between them operable to establish communication between each compartment and the remaining compartments, said heating means entering through the bottom wall of the casing, means elevating said bottom wall with respect to the floor, and said bottom wall having openings therethrough for entrance of air.

3. A warmer having a casing provided with a raised bottom wall, end walls and side walls rising therefrom, partition walls within the casing providing individual juxta-posed compartments, a top wall on said side walls, end walls and partition walls, containers, said top wall having container-receiving openings to support the containers in positions depending into the compartments, reenforcing elements surrounding said openings, fastening means securing the side walls, end walls and partition walls together and the reenforcing elements thereto, a feeder pipe disposed below the bottom wall, burners within the compartments, pipes leading from the feeder to the burners and through the bottom wall, cut-off valves for said pipes below the bottom wall, means operable to establish communication between the compartments, and a discharge flue leading from one of the end walls.

In testimony whereof I affix my signature in presence of two witnesses.

ARTHUR S. OLDHAM.

Witnesses:
GUSSIE McCAMMON,
C. V. AYRES.